US009824573B1

(12) United States Patent
Beres et al.

(10) Patent No.: US 9,824,573 B1
(45) Date of Patent: Nov. 21, 2017

(54) COMPUTERIZED FURNITURE-ENABLED MONITORING AND DISCOURAGEMENT OF SEDENTARY BEHAVIOR

(71) Applicant: International Business Machines Corporation, Armonk, NY (US)

(72) Inventors: Tibor Beres, Cary, NC (US); Keith A. Boone, Raleigh, NC (US); Matthew P. Holt, Raleigh, NC (US); Wisam Mohammed, Raleigh, NC (US); Michael K. Pruitt, Brecksville, OH (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/266,037

(22) Filed: Sep. 15, 2016

(51) Int. Cl.
| | | |
|---|---|---|
| *G08B 21/24* | (2006.01) | |
| *A47C 7/74* | (2006.01) | |
| *A47C 7/54* | (2006.01) | |
| *A47C 7/38* | (2006.01) | |
| *A47C 7/02* | (2006.01) | |
| *A47C 7/72* | (2006.01) | |
| *A47C 1/02* | (2006.01) | |
| *G05B 15/02* | (2006.01) | |
| *G08B 6/00* | (2006.01) | |

(52) U.S. Cl.
CPC ............... *G08B 21/24* (2013.01); *A47C 1/02* (2013.01); *A47C 7/02* (2013.01); *A47C 7/38* (2013.01); *A47C 7/54* (2013.01); *A47C 7/725* (2013.01); *A47C 7/748* (2013.01); *G05B 15/02* (2013.01); *G08B 6/00* (2013.01)

(58) Field of Classification Search
CPC .. G08B 21/24; G08B 6/00; A47C 1/02; A47C 7/748; A47C 7/725; A47C 7/02; A47C 7/38; A47C 7/54; G05B 15/02
USPC .......................................................... 700/900
See application file for complete search history.

(56) References Cited

U.S. PATENT DOCUMENTS

| | | | | | |
|---|---|---|---|---|---|
| 2,564,762 | A | * | 8/1951 | Howard .................. | G07F 17/08 194/241 |
| 6,236,622 | B1 | * | 5/2001 | Blackman .............. | G04B 47/00 362/253 |

(Continued)

OTHER PUBLICATIONS

Northwood Intouch, retrieved from Internet on Jun. 24, 2016, Sensors | Northwood Intouch http://northwoodintouch.com/solutions/other-sensors/, 8 pages.

(Continued)

*Primary Examiner* — Kenneth M Lo
*Assistant Examiner* — Alan Chu
(74) *Attorney, Agent, or Firm* — Schmeiser, Olsen & Watts, LLP; William H. Hartwell (57) ABSTRACT

A method and associated systems for furniture-enabled monitoring and discouragement of sedentary behavior. One or more sensors embedded into a computer-monitored and computer-controlled piece of furniture determine that a user has sat or reclined on the piece of furniture for a predetermined period of time. In response, controllers embedded into the furniture are directed to make the furniture less comfortable in order to encourage the user to get up. In some cases, if the user does not get up, the controllers continue to make the furniture increasingly uncomfortable. Once the user does get up, the furniture is restored to its original comfortable condition after a specified period of time.

4 Claims, 3 Drawing Sheets

(56) References Cited

U.S. PATENT DOCUMENTS

| | | | |
|---|---|---|---|
| 8,558,702 B2 | 10/2013 | Smith et al. | |
| 2008/0007103 A1* | 1/2008 | Welles | A61B 5/11 |
| | | | 297/330 |
| 2012/0139732 A1* | 6/2012 | Smith | A61B 5/00 |
| | | | 340/573.1 |
| 2013/0006125 A1 | 1/2013 | Kroll et al. | |
| 2014/0295390 A1 | 10/2014 | Brynelsen et al. | |
| 2016/0022047 A1* | 1/2016 | Wu | A47C 7/62 |
| | | | 297/217.4 |
| 2016/0183687 A1* | 6/2016 | Hoyt | A47C 31/126 |
| | | | 297/217.2 |

OTHER PUBLICATIONS

Gemma Battenbough, Dec. 7, 2012, Chair alarm tights sitting disease http://www.news.com.au/finance/work/chair-alarm-tights-sitting-disease/ . . . , news.com.au, 2 pages.

The University of Queensland, retrieved from Internet Jun. 24, 2016, MNS—CRExPAH researchers develop sitting pad http://www.hms.uq.edu.au/research/research-centres/centre-for-research- . . . , 4 pages.

J. Poujaud, N. Noury, Identification of inactivity behavior in Smart Home, 30th Annual International IEEE EMBS Conference, Vancouver, British Columbia, Canada, Aug. 20-24, 2008, pp. 2075-2078.

* cited by examiner

FIG. 3

COMPUTERIZED FURNITURE-ENABLED MONITORING AND DISCOURAGEMENT OF SEDENTARY BEHAVIOR

BACKGROUND

The present invention relates to computerized furniture and in particular, to computerized furniture that automatically makes itself uncomfortable when it detects that a user has been sitting or reclining too long.

A sedentary lifestyle that includes sitting or reclining for long periods of time can contribute to health problems. There is thus a need for intelligent furniture that automatically encourages users to stand up after a certain period of time.

BRIEF SUMMARY

An embodiment of the present invention provides a method for furniture-enabled monitoring and discouragement of sedentary behavior, the method comprising:

receiving a first input from a sensor embedded into a piece of furniture, where the sensor is capable of indicating whether a user is sitting or reclining on the piece of furniture, and where the first input indicates that a user has begun sitting or reclining on the piece of furniture;

determining that a first duration of time has elapsed since the user began sitting or reclining on the piece of furniture, and that the user has continuously sat or reclined on the piece of furniture during the first duration of time; and directing the piece of furniture, in response to the determining, to perform a first comfort-altering action, where the first comfort-altering action makes the piece of furniture less comfortable for the user.

Another embodiment of the present invention provides a computerized furniture-monitoring system comprising a processor, a memory coupled to the processor, one or more sensors embedded into a piece of furniture, one or more controllers embedded into the piece of furniture, and a computer-readable hardware storage device coupled to the processor, the storage device containing program code configured to be run by the processor via the memory to implement a method for furniture-enabled monitoring and discouragement of sedentary behavior, the method comprising:

the system receiving a first input from a first sensor of the one or more sensors, where the first sensor is capable of indicating whether a user is sitting or reclining on the piece of furniture, and where the first input indicates that a user has begun sitting or reclining on the piece of furniture;

the system determining that a first duration of time has elapsed since the user began sitting or reclining on the piece of furniture, and that the user has continuously sat or reclined on the piece of furniture during the first duration of time; and the system directing the piece of furniture, in response to the determining, to perform a first comfort-altering action, where the first comfort-altering action makes the piece of furniture less comfortable for the user.

Yet another embodiment of the present invention provides a computer program product, comprising a computer-readable hardware storage device having a computer-readable program code stored therein, the program code configured to be executed by a computerized furniture-monitoring system comprising a processor, a memory coupled to the processor, one or more sensors embedded into a piece of furniture, one or more controllers embedded into the piece of furniture, and a computer-readable hardware storage device coupled to the processor, the storage device containing program code configured to be run by the processor via the memory to implement a method for furniture-enabled monitoring and discouragement of sedentary behavior, the method comprising:

receiving a first input from a first sensor of the one or more sensors, where the first sensor is capable of indicating whether a user is sitting or reclining on the piece of furniture, and where the first input indicates that a user has begun sitting or reclining on the piece of furniture;

determining that a first duration of time has elapsed since the user began sitting or reclining on the piece of furniture, and that the user has continuously sat or reclined on the piece of furniture during the first duration of time; and directing the piece of furniture, in response to the determining, to perform a first comfort-altering action, where the first comfort-altering action makes the piece of furniture less comfortable for the user.

DETAILED DESCRIPTION

Embodiments of the present invention comprise a computerized furniture-monitoring and control mechanism that determines when a user has been sitting or reclining on a piece of furniture 117 longer than a specified duration of time. Upon making such a determination, the mechanism directs the furniture 117 to perform comfort-altering actions that encourage the user to get up.

In some embodiments, this invention may be incorporated into an "Internet of Things" implementation, where furniture 117 may be directed by an Internet or World Wide Web application or by a user who directs or sets a configuration of the furniture through an Internet-based communications link.

In some embodiments, the furniture may be directed to perform a particular sequence of actions, scheduling each action to occur after determining that the user continues to sit or recline on the furniture for a duration of time after the performance of a previous action. In some cases, each activity may make the furniture progressively less comfortable, and in certain embodiments, the final activity may make the furniture unusable or nearly unusable for sitting or reclining.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
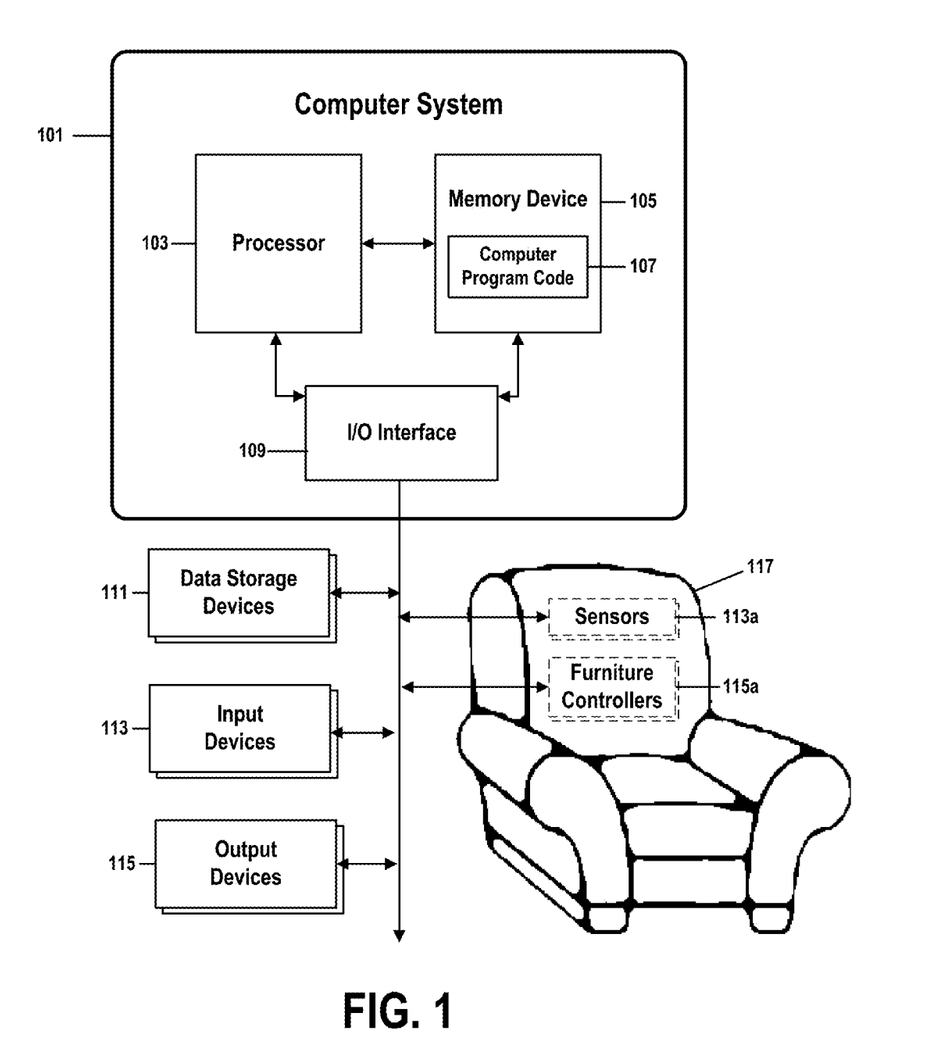
FIG. 1 shows a structure of a computer system and computer program code that may be used to implement a method for furniture-enabled monitoring and discouragement of sedentary behavior in accordance with embodiments of the present invention.

FIG. 1 shows a structure of a computer system and computer program code that may be used to implement a method for furniture-enabled monitoring and discouragement of sedentary behavior in accordance with embodiments of the present invention. FIG. 1 refers to objects 101-117.

In FIG. 1, computer system 101 comprises a processor 103 coupled through one or more I/O Interfaces 109 to one or more hardware data storage devices 111 and one or more I/O devices 113, 113*a*, 115, and 115*a*.

Hardware data storage devices 111 may include, but are not limited to, magnetic tape drives, fixed or removable hard disks, optical discs, storage-equipped mobile devices, and solid-state random-access or read-only storage devices. I/O devices may comprise, but are not limited to: input devices 113 and 113*a*, such as keyboards, scanners, handheld telecommunications devices, touch-sensitive displays, tablets, biometric readers, joysticks, trackballs, or computer mice; and output devices 115, which may comprise, but are not limited to printers, plotters, tablets, mobile telephones, displays, or sound-producing devices. In particular, sensors 113*a* may comprise pressure sensors or other types of sensors embedded into articles of furniture 117 that are capable of detecting when a person is sitting in a chair 117 or laying in a bed 117. Similarly, furniture-controller devices 15*a* may comprise any device capable of altering a function, shape, firmness, or other characteristics of an article of furniture 117, and may also control other functions of a chair, bed, or other piece of furniture 117, such as a vibrating mechanism, an audio or video alarm, an air pump, a pulley, a tethered or wireless communications interface, a mechanical or robotic apparatus, or a user-interface device like an embedded monitor.

Data storage devices 111, input devices 113 and 113*a*, and output devices 115 and 115*a* may be located either locally or at remote sites from which they may be connected to UI/O Interface 109 through a network interface.

Although not shown in FIG. 1, in some embodiments, other input devices 113 or output devices 115 may also be physically incorporated into the monitored piece of furniture 117. For example, a touch-screen display may be embedded into an arm of an armchair 117 in order to allow a user to set predefined durations of time described in FIGS. 2 and 3, or an emergency-reset button may be affixed to or embedded into a bed 117 in order to allow a user to disable an embodiment of the present invention in the event of an emergency.

Processor 103 may also be connected to one or more memory devices 105, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 105 contains stored computer program code 107, which is a computer program that comprises computer-executable instructions. The stored computer program code includes a program that implements a method for furniture-enabled monitoring and discouragement of sedentary behavior in accordance with embodiments of the present invention, and may implement other embodiments described in this specification, including the methods illustrated in FIGS. 1-3. The data storage devices 111 may store the computer program code 107. Computer program code 107 stored in the storage devices 111 is configured to be executed by processor 103 via the memory devices 105. Processor 103 executes the stored computer program code 107.

In some embodiments, rather than being stored and accessed from a hard drive, optical disc or other writeable, rewriteable, or removable hardware data-storage device 111, stored computer program code 107 may be stored on a static, nonremovable, read-only storage medium such as a Read-Only Memory (ROM) device 105, or may be accessed by processor 103 directly from such a static, nonremovable, read-only medium 105. Similarly, in some embodiments, stored computer program code 107 may be stored as computer-readable firmware 105, or may be accessed by processor 103 directly from such firmware 105, rather than from a more dynamic or removable hardware data-storage device 111, such as a hard drive or optical disc.

Thus the present invention discloses a process for supporting computer infrastructure, integrating, hosting, maintaining, and deploying computer-readable code into the computer system 101, wherein the code in combination with the computer system 101 is capable of performing a method for furniture-enabled monitoring and discouragement of sedentary behavior.

Any of the components of the present invention could be created, integrated, hosted, maintained, deployed, managed, serviced, supported, etc. by a service provider who offers to facilitate a method for furniture-enabled monitoring and discouragement of sedentary behavior. Thus the present invention discloses a process for deploying or integrating computing infrastructure, comprising integrating computer-readable code into the computer system 101, wherein the code in combination with the computer system 101 is capable of performing a method for furniture-enabled monitoring and discouragement of sedentary behavior.

One or more data storage units 111 (or one or more additional memory devices not shown in FIG. 1) may be used as a computer-readable hardware storage device having a computer-readable program embodied therein and/or having other data stored therein, wherein the computer-readable program comprises stored computer program code 107. Generally, a computer program product (or, alternatively, an article of manufacture) of computer system 101 may comprise the computer-readable hardware storage device.

While it is understood that program code 107 for a method for furniture-enabled monitoring and discouragement of sedentary behavior may be deployed by manually loading the program code 107 directly into client, server, and proxy computers (not shown) by loading the program code 107 into a computer-readable storage medium (e.g., computer data storage device 111), program code 107 may also be automatically or semi-automatically deployed into computer system 101 by sending program code 107 to a central server (e.g., computer system 101) or to a group of central servers. Program code 107 may then be downloaded into client computers (not shown) that will execute program code 107.

Alternatively, program code 107 may be sent directly to the client computer via e-mail. Program code 107 may then either be detached to a directory on the client computer or loaded into a directory on the client computer by an e-mail option that selects a program that detaches program code 107 into the directory.

Another alternative is to send program code 107 directly to a directory on the client computer hard drive. If proxy servers are configured, the process selects the proxy server code, determines on which computers to place the proxy servers' code, transmits the proxy server code, and then installs the proxy server code on the proxy computer. Program code 107 is then transmitted to the proxy server and stored on the proxy server.

In one embodiment, program code 107 for a method for furniture-enabled monitoring and discouragement of sedentary behavior is integrated into a client, server and network environment by providing for program code 107 to coexist with software applications (not shown), operating systems (not shown) and network operating systems software (not shown) and then installing program code 107 on the clients and servers in the environment where program code 107 will function.

The first step of the aforementioned integration of code included in program code 107 is to identify any software on the clients and servers, including the network operating system (not shown), where program code 107 will be deployed that are required by program code 107 or that work in conjunction with program code 107. This identified software includes the network operating system, where the network operating system comprises software that enhances a basic operating system by adding networking features. Next, the software applications and version numbers are identified and compared to a list of software applications and correct version numbers that have been tested to work with program code 107. A software application that is missing or that does not match a correct version number is upgraded to the correct version.

A program instruction that passes parameters from program code 107 to a software application is checked to ensure that the instruction's parameter list matches a parameter list required by the program code 107. Conversely, a parameter passed by the software application to program code 107 is checked to ensure that the parameter matches a parameter required by program code 107. The client and server operating systems, including the network operating systems, are identified and compared to a list of operating systems, version numbers, and network software programs that have been tested to work with program code 107. An operating system, version number, or network software program that does not match an entry of the list of tested operating systems and version numbers is upgraded to the listed level on the client computers and upgraded to the listed level on the server computers.

After ensuring that the software, where program code 107 is to be deployed, is at a correct version level that has been tested to work with program code 107, the integration is completed by installing program code 107 on the clients and servers.

Embodiments of the present invention may be implemented as a method performed by a processor of a computer system, as a computer program product, as a computer system, or as a processor-performed process or service for supporting computer infrastructure.

Figure 2:
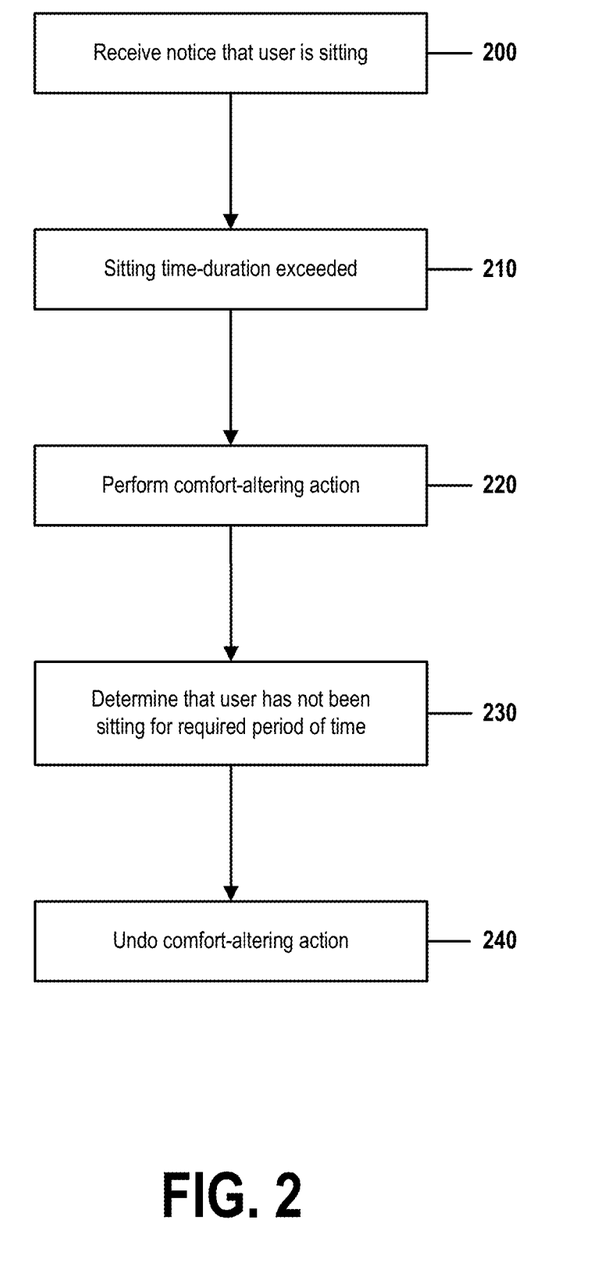
FIG. 2 is a flow chart that illustrates a first embodiment of a method for furniture-enabled monitoring and discouragement of sedentary behavior in accordance with embodiments of the present invention.

FIG. 2 is a flow chart that illustrates the steps of a method for furniture-enabled monitoring and discouragement of sedentary behavior in accordance with embodiments of the present invention. FIG. 2 contains steps 200-240.

In step 200, a furniture-monitoring system receives notice that a user has sat or reclined on a monitored piece of furniture. The piece of furniture may be of any type that accommodates a sitting or reclining user, such as a chair, a love seat, a couch, a recliner, a bed, a hospital bed, a wheelchair or transport chair, or a divan.

The monitoring system may comprise one or more hardware sensors embedded into a monitored piece of furniture 117 that identify, by means known in the art, when a user is sitting or reclining on the furniture 117. The piece of furniture comprises mechanical, electrical, electronic, pneumatic, or other means known in the art for performing comfort-altering actions, such as changing a stiffness of a surface or a firmness of support, or generating a vibration or an audio or visual alert. The furniture may also use these means to move a component of the furniture, such as changing an angle of an armrest, tilting a seat, or partially deflating a pillow.

The sensor may be of any type known in the art that is capable of detecting when a user is sitting or reclining on the piece of furniture, such as a pressure sensor, a weight-measuring scale, a thermal sensor, an accelerometer, a motion detector, or any other sensor capable of identifying a change in the relative positions of certain components of the furniture or of detecting a change in a user's body position.

In certain embodiments of the present invention, the system may be capable of receiving notice when a user begins sitting or reclining and when a user gets up from the piece of furniture. In other embodiments, the system may be able to receive notice only of when a user is currently sitting or reclining on the piece of furniture. In the latter case, the system may infer that the user has gotten up when the system no longer receives from the sensor notice that the user is currently sitting or reclining.

In some embodiments, multiple sensors, or multiple types of sensors, may be embedded into the piece of furniture. In some cases, the system of such an embodiment may receive notice that a user has begun, or is no longer, sitting or reclining, when any of the sensors identifies a changed user position. In other cases, the system may receive such notice only when a predetermined combination of sensors send signals or other types of notifications that identify a same changed user position.

In step 210, the monitoring system determines that a predetermined period of time has elapsed without receiving notice that the user is no longer sitting or reclining on the piece of furniture. This determination may be made by any of the means described above, such as by receiving a continuous or periodic signal from a sensor that the user continues to sit or recline, or by a failure to receive a signal that the user is no longer sitting or reclining.

The predetermined period of time may have been previously specified by any means known in the art. For example, it may have been set by a manufacturer of the furniture or of the monitoring system, based on factors such as generally accepted public-health recommendations or government guidelines. It may have been set by a purchaser or by the user, by means of a user interface embedded in the furniture 117, connected to the furniture 117 either through a cable or through a wireless connection, or as part of a standalone computerized module that communicates only with the sensors and with furniture-controlling mechanical means described below.

In step 220, the system, in response to determining that the user has sat or reclined for a duration of time exceeding the predetermined period of time, the system directs the furniture-controlling mechanical means to perform one or more comfort-altering actions. In some embodiments, a goal of these actions is to make the furniture less comfortable or to otherwise encourage the user to get up. In other embodiments, the action may noticeably change a characteristic of the furniture so as to alert the user that the predetermined period of time has elapsed, even though this characteristic change may not be considered by some users to make the furniture less comfortable.

As described in step 200, the comfort-altering characteristic change may comprise any combination of electrical, mechanical, electronic, pneumatic, or other types of alterations to one or more characteristics of the furniture that might alter a user's degree of comfort when sitting or reclining on the furniture. In some embodiments, the change may comprise an audio, tactile, or visual alert, which may be tailored to make the user less comfortable, such as a strident or loud audio tone, a vibration, or a flashing light.

In step 230, the monitoring system determines that the user is no longer sitting or reclining on the piece of furniture, and that the user has not sat or reclined on the furniture for a second predetermined period of time. As in step 210, these determinations may be made by any of the means described above, such as by receiving a single notification, a continuous signal, or periodic signals from one or more sensors indicating that the user is not sitting or reclining, or by a failure to receive a signal that would have indicated that the user is sitting or reclining.

Like the first predetermined period of time described in step 210, the second predetermined period of time may have been set by any means known in the art, including those described in step 210.

In step 240, in response to determining that the user has not sat or reclined on the furniture for the second predetermined period of time, the system directs the piece of furniture to undo the comfort-altering action of step 220.

For example, if the action of step 220 was to deflate a headrest or stiffen a seat cushion, the system would in step 240 direct the furniture to return the headrest or seat cushion to its prior condition. In all embodiments, at the conclusion of step 240, the piece of furniture will have returned to its original condition, as that condition existed during step 200. The user will then be free to resume sitting or reclining on the piece of furniture without experiencing the effects of the comfort-altering actions.

Figure 3:
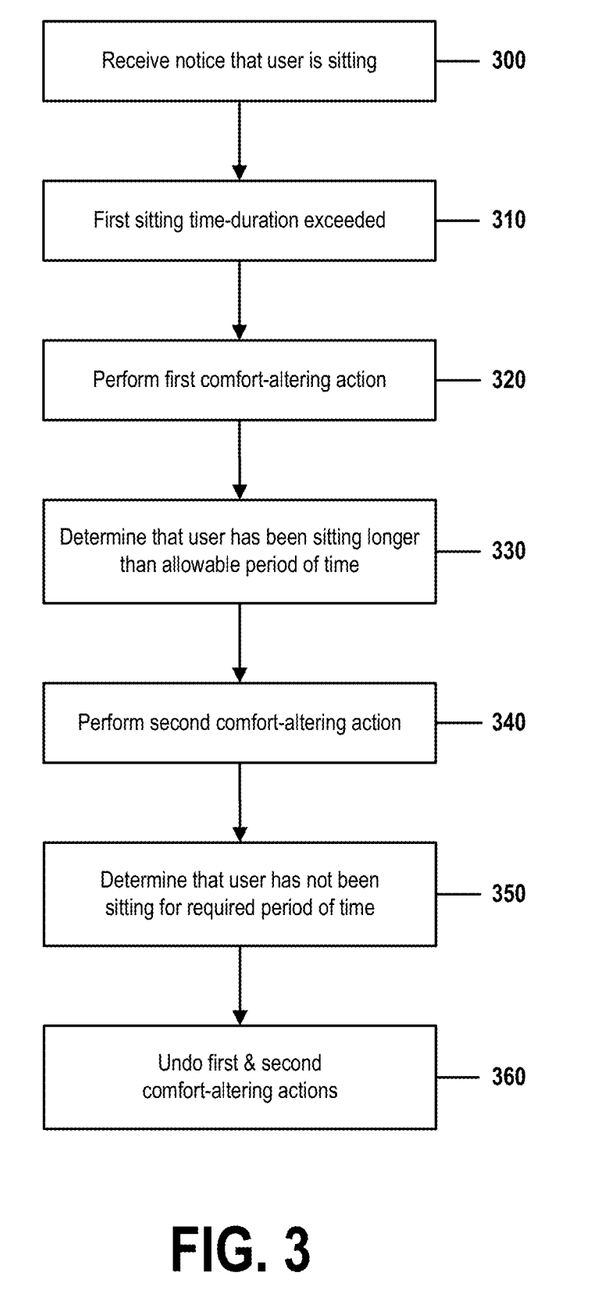
FIG. 3 is a flow chart that illustrates a second embodiment of a method for furniture-enabled monitoring and discouragement of sedentary behavior in accordance with embodiments of the present invention.

FIG. 3 is a flow chart that illustrates the steps of a method for furniture-enabled monitoring and discouragement of sedentary behavior in accordance with embodiments of the present invention. FIG. 3 contains steps 300-360.

In step 300, a furniture-monitoring system receives notice that a user has sat or reclined on a monitored piece of furniture 117. As in FIG. 2, the piece of furniture may be of any type that accommodates a sitting or reclining user, such as a chair, a love seat, a couch, a recliner, a bed, a hospital bed, a wheelchair or transport chair, or a divan.

The monitoring system may comprise one or more embedded hardware sensors, similar to those of FIG. 2, that identify, by means known in the art, when a user is sitting or reclining on the monitored piece of furniture. As in FIG. 2, the piece of furniture comprises mechanical, electrical, electronic, pneumatic, or other means known in the art for performing comfort-altering actions, such as changing a stiffness of a fabric, a softness or firmness of support, a vibration, or an audio or visual alert. The furniture may also use these means to move a component of the furniture, such as changing an angle of an armrest, tilting a seat, or partially deflating a pillow.

In certain embodiments of the present invention, the system may be capable of receiving notice both when a user begins sitting or reclining and when a user gets up from the piece of furniture. In other embodiments, the system may be able to receive notice only when a user first sits or reclines, or continues to sit or recline, on the piece of furniture. In the latter case, the system may infer that the user has gotten up when the system no longer receives from the sensor notice that the user is currently sitting or reclining.

In step 310, the monitoring system determines that a first predetermined period of time has passed without receiving notice that the user is no longer sitting or reclining on the piece of furniture. This determination may be made by any of the means described above and in FIG. 2. The first predetermined period of time may have been set by any means known in the art, including means described in FIG. 2.

In step 320, the system, in response to determining that the user has sat or reclined for a duration of time exceeding the first predetermined period of time, the system directs the furniture-controlling mechanical means to perform a first set of one or more comfort-altering actions similar to actions described in step 220 of FIG. 2.

In step 330, the monitoring system determines that, despite the comfort-altering action of step 320, the user has continuously sat or reclined on the piece of furniture for a duration of time exceeding a second predetermined period of time. In some embodiments, this second period of time may have begun in step 300, when the system first detected that the user had begun sitting or reclining on the piece of furniture. In other embodiments, this second period of time may have begun in step 320, when the system performed the first comfort-altering action.

As in step 310, the system may make these determinations by any of the means described above and in step 210 of FIG. 2.

In step 340, in response to determining that the user has not continued to sit or recline on the furniture for the second predetermined period of time, the system directs the piece of furniture to perform a second set of one or more comfort-altering actions by means of one or more furniture controllers 115*a* embedded into the furniture.

These second actions may comprise any combination of comfort-altering actions described above. In some embodiments, the second action may be deemed to decrease the comfort of the piece of furniture such that the furniture becomes even less comfortable than it was after the performance of the first comfort-altering action.

In some embodiments, the first action may be undone (as it was in step 240) when the second action is performed. In such cases, the second action may be considered to be so uncomfortable that the comfort level of the furniture decreases despite the undoing of the first action.

In other embodiments, the second action is performed without undoing the first action. For example, if the first action comprises stiffening the furniture's seat cushion and the second action comprises flashing a bright light and turning a backpad-heater to a high setting, at the conclusion of step 340, all three discomfort-producing actions would be concurrently active.

In step 350, the monitoring system determines that the user is no longer sitting or reclining on the piece of furniture, and that the user has not sat or reclined on the furniture for a third predetermined period of time. These determinations may be made by any of the means described above and in FIG. 2.

Like the first and second predetermined periods of time, the third predetermined period of time may have been set by any means known in the art, including those described in steps 200 and 210 of FIG. 2. In some embodiments, the third period of time may have begun at the earliest time that the system determined that the user was no longer sitting or reclining on the piece of furniture.

In step 360, in response to determining that the user has not sat or reclined on the furniture for the third predetermined period of time, the system directs the piece of furniture to undo the first and second comfort-altering actions, if they have not already been undone. As in step 240 of FIG. 2, this returns the piece of furniture to its original condition, as that condition existed during step 300. The user is now free to resume sitting or reclining on the piece of furniture without being forced to endure the results of the first or second comfort-altering actions.

The examples and embodiments described here should not be construed to limit the scope the present invention. Some embodiments, for example, may comprise additional comfort-altering actions that are each performed when the furniture reports that the user continues to sit or recline on the furniture for an additional predetermined period of time despite the performance of previous comfort-altering actions. There is no theoretical constraint on the number or sequence of such actions.

These periods of time may be fixed, they may vary according to predetermined rules or may vary randomly, some or all may be set by a user, or each may be dependent upon which comfort-altering action precedes or follows.

There is no theoretical constraint on the number or sequence of such actions, although some embodiments may attempt to make each action produce a greater level of discomfort, and may thus provide increasing incentive for a user to cease sitting or reclining. In some cases, each comfort-altering action in a sequence may be intended to be more extreme than preceding comfort-altering actions. In some cases, each comfort-altering action may be intended to increase discomfort when its effects are taken in aggregate with effects of previous comfort-altering actions, some of which may have continued to remain in effect. In other embodiments, comfort-altering actions may be chosen or sequenced by other means, such as being preprogrammed into the system or into the furniture itself or chosen by a user of the furniture or by an operator of the system.

In certain embodiments, an order of performance of comfort-altering actions may not be related to a relative degree of discomfort created by performing one or more of the actions. In some cases, comfort-altering actions may be selected or sequenced automatically, as functions of user or environmental characteristics entered into the system or detected by the furniture. For example, an action, or a severity of an action, might be selected as a function of a user's body weight or height, as entered through a user interface or as measured by one or more sensors in the furniture. In another example, other embodiments might similarly consider environmental air temperature or ambient to determine whether to perform a comfort-altering action that comprises turning on a heating element or a visual alert mechanism embedded into the piece of furniture.

Many other variations are possible, but all embodiments will attempt to encourage a user to get up from a monitored piece of furniture through one or more comfort-altering actions that are each triggered at least in part by a passage of time during which a user sits or reclines on the furniture.

What is claimed is:

1. A method for furniture-enabled monitoring and discouragement of sedentary behavior, the method comprising:
   receiving a first input from a sensor embedded into a piece of furniture, where the sensor is capable of indicating whether a user is sitting or reclining on the piece of furniture, where the first input indicates that a user has begun sitting or reclining on the piece of furniture, and where the user has indicated a sequence of increasingly uncomfortable comfort-altering actions capable of being performed by the piece of furniture;
   determining that a first duration of time has elapsed since the user began sitting or reclining on the piece of furniture;
   identifying whether the user has continuously sat or reclined on the piece of furniture during the first duration of time;
   if, in response to the identifying, detecting that the user has continuously sat or reclined on the piece of furniture during the first duration of time, directing the piece of furniture to perform a first comfort-altering action of the sequence of actions, where the first comfort-altering action comprises a first alteration to a shape of the piece of furniture, and where the user has indicated that the first alteration is capable of making the piece of furniture feel less comfortable to the user;
   further identifying whether the user has continuously sat or reclined on the piece of furniture for a second duration of time, where the second duration of time ended at a time later than did the first duration of time;
   if, in response to the further identifying, verifying that the user has not continuously sat or reclined on the piece of furniture for a second duration of time, further directing the piece of furniture to restore the piece of furniture to its original state by undoing the first comfort-altering action; and
   if, in response to the further identifying, ascertaining that the user has continuously sat or reclined on the piece of furniture during the second duration of time:
   causing the piece of furniture to perform a second comfort-altering action of the sequence of actions, where the second comfort-altering action comprises a second alteration to the shape of the piece of furniture, where an effect of the first comfort-altering action is distinct from an effect of the second comfort-altering action, and where the user has indicated that the second alteration is capable of making the piece of furniture feel less comfortable to the user than did the first alteration;
   further determining that the user has continuously sat or reclined on the piece of furniture during a third duration of time, where the third duration of time ended at a time later than did the second duration of time; and
   further causing the piece of furniture to perform a third comfort-altering action of the sequence of actions, where the third comfort-altering action comprises a third alteration to the shape of the piece of furniture, where an effect of the third comfort-altering action is distinct from an effect of either the first comfort-altering action or the second comfort-altering action, and where the user has indicated that the third alteration is capable of making the piece of furniture feel less comfortable to the user than did the second alteration;
   where the first alteration consists of changing a position of a component of the piece of furniture, the second alteration consists of changing a stiffness of a surface of the piece of furniture, and the third alteration consists of changing a degree of firmness of a component of the piece of furniture, and
   where the first alteration, the second alteration, and the third alteration are performed in a sequence that has been indicated by the user as making the piece of furniture increasingly uncomfortable.

2. The method of claim 1, further comprising providing at least one support service for at least one of creating, integrating, hosting, maintaining, and deploying computer-readable program code in the computer system, wherein the computer-readable program code in combination with the computer system is configured to implement the receiving, the determining, the identifying, the detecting, the further identifying, the verifying, the further directing, the ascertaining, the causing, the further determining, and the further causing.

3. A computerized furniture-monitoring system comprising a processor, a memory coupled to the processor, one or more sensors embedded into a piece of furniture, one or more controllers embedded into the piece of furniture, and a computer-readable hardware storage device coupled to the processor, the storage device containing program code configured to be run by the processor via the memory to implement a method for furniture-enabled monitoring and discouragement of sedentary behavior, the method comprising:
   the system receiving a first input from a sensor embedded into a piece of furniture, where the sensor is capable of indicating whether a user is sitting or reclining on the piece of furniture, where the first input indicates that a user has begun sitting or reclining on the piece of furniture, and where the user has indicated a sequence of increasingly uncomfortable comfort-altering actions capable of being performed by the piece of furniture;

the system determining that a first duration of time has elapsed since the user began sitting or reclining on the piece of furniture;

the system identifying whether the user has continuously sat or reclined on the piece of furniture during the first duration of time;

the system, if identifying that the user has continuously sat or reclined on the piece of furniture during the first duration of time, directing the piece of furniture to perform a first comfort-altering action of the sequence of actions, where the first comfort-altering action comprises a first alteration to a shape of the piece of furniture, and where the user has indicated that the first alteration is capable of making the piece of furniture feel less comfortable to the user if, in response to the identifying, detecting that the user has continuously sat or reclined on the piece of furniture during the first duration of time, the system directing the piece of furniture to perform a first comfort-altering action of the sequence of actions, where the first comfort-altering action comprises a first alteration to a shape of the piece of furniture, and where the user has indicated that the first alteration is capable of making the piece of furniture feel less comfortable to the user;

the system further identifying whether the user has continuously sat or reclined on the piece of furniture for a second duration of time, where the second duration of time ended at a time later than did the first duration of time;

if, in response to the further identifying, the system verifying that the user has not continuously sat or reclined on the piece of furniture for a second duration of time, the system further directing the piece of furniture to restore the piece of furniture to its original state by undoing the first comfort-altering action; and if, in response to the further identifying, the system ascertaining that the user has continuously sat or reclined on the piece of furniture during the second duration of time:

the system causing the piece of furniture to perform a second comfort-altering action of the sequence of actions, where the second comfort-altering action comprises a second alteration to the shape of the piece of furniture, where an effect of the first comfort-altering action is distinct from an effect of the second comfort-altering action, and where the user has indicated that the second alteration is capable of making the piece of furniture feel less comfortable to the user than did the first alteration;

the system further determining that the user has continuously sat or reclined on the piece of furniture during a third duration of time, where the third duration of time ended at a time later than did the second duration of time; and the system further causing the piece of furniture to perform a third comfort-altering action of the sequence of actions, where the third comfort-altering action comprises a third alteration to the shape of the piece of furniture, where an effect of the third comfort-altering action is distinct from an effect of either the first comfort-altering action or the second comfort-altering action, and where the user has indicated that the third alteration is capable of making the piece of furniture feel less comfortable to the user than did the second alteration;

where the first alteration consists of changing a position of a component of the piece of furniture, the second alteration consists of changing a stiffness of a surface of the piece of furniture, and the third alteration consists of changing a degree of firmness of a component of the piece of furniture, and where the first alteration, the second alteration, and the third alteration are performed in a sequence that has been indicated by the user as making the piece of furniture increasingly uncomfortable.

4. A computer program product, comprising a computer-readable hardware storage device having a computer-readable program code stored therein, the program code configured to be executed by a computerized furniture-monitoring system comprising a processor, a memory coupled to the processor, one or more sensors embedded into a piece of furniture, one or more controllers embedded into the piece of furniture, and a computer-readable hardware storage device coupled to the processor, the storage device containing program code configured to be run by the processor via the memory to implement a method for furniture-enabled monitoring and discouragement of sedentary behavior, the method comprising:

receiving a first input from a sensor embedded into a piece of furniture, where the sensor is capable of indicating whether a user is sitting or reclining on the piece of furniture, where the first input indicates that a user has begun sitting or reclining on the piece of furniture, and where the user has indicated a sequence of increasingly uncomfortable comfort-altering actions capable of being performed by the piece of furniture;

determining that a first duration of time has elapsed since the user began sitting or reclining on the piece of furniture;

identifying whether the user has continuously sat or reclined on the piece of furniture during the first duration of time; and if, in response to the identifying, detecting that the user has continuously sat or reclined on the piece of furniture during the first duration of time, directing the piece of furniture to perform a first comfort-altering action of the sequence of actions, where the first comfort-altering action comprises a first alteration to a shape of the piece of furniture, and where the user has indicated that the first alteration is capable of making the piece of furniture feel less comfortable to the user;

further identifying whether the user has continuously sat or reclined on the piece of furniture for a second duration of time, where the second duration of time ended at a time later than did the first duration of time;

if, in response to the further identifying, verifying that the user has not continuously sat or reclined on the piece of furniture for a second duration of time, further directing the piece of furniture to restore the piece of furniture to its original state by undoing the first comfort-altering action; and if, in response to the further identifying, ascertaining that the user has continuously sat or reclined on the piece of furniture during the second duration of time:

causing the piece of furniture to perform a second comfort-altering action of the sequence of actions, where the second comfort-altering action comprises a second alteration to the shape of the piece of furniture, where an effect of the first comfort-altering action is distinct from an effect of the second comfort-altering action, and where the user has indicated that the second alteration is capable of making the piece of furniture feel less comfortable to the user than did the first alteration;

further determining that the user has continuously sat or reclined on the piece of furniture during a third duration of time, where the third duration of time ended at a time later than did the second duration of time; and further causing the piece of furniture to perform a third comfort-altering action of the sequence of actions, where the third comfort-altering action comprises a third alteration to the shape of the piece of furniture, where an effect of the third comfort-altering action is distinct from an effect of either the first comfort-altering action or the second comfort-altering action, and where the user has indicated that the third alteration is capable of making the piece of furniture feel less comfortable to the user than did the second alteration;

where the first alteration consists of changing a position of a component of the piece of furniture, the second alteration consists of changing a stiffness of a surface of the piece of furniture, and the third alteration consists of changing a degree of firmness of a component of the piece of furniture, and where the first alteration, the second alteration, and the third alteration are performed in a sequence that has been indicated by the user as making the piece of furniture increasingly uncomfortable.

\* \* \* \* \*